US009542876B2

United States Patent
Wu et al.

(10) Patent No.: US 9,542,876 B2
(45) Date of Patent: Jan. 10, 2017

(54) METHOD OF OBTAINING LUMINANCE AND CHROMATICITY OF WHITE IN RGBW DISPLAY DEVICE USING RGB DISPLAY DEVICE

(71) Applicant: SHENZHEN CHINA STAR OPTOELECTRONICS TECHNOLOGY CO., LTD., Shenzhen, Guangdong (CN)

(72) Inventors: Jinjun Wu, Guangdong (CN); Weiwei Zheng, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 331 days.

(21) Appl. No.: 14/360,698

(22) PCT Filed: May 4, 2014

(86) PCT No.: PCT/CN2014/076735
§ 371 (c)(1),
(2) Date: May 27, 2014

(87) PCT Pub. No.: WO2015/165123
PCT Pub. Date: Nov. 5, 2015

(65) Prior Publication Data
US 2016/0240123 A1 Aug. 18, 2016

(30) Foreign Application Priority Data
Apr. 28, 2014 (CN) .......................... 2014 1 0175893

(51) Int. Cl.
G09G 3/20 (2006.01)
G01M 11/02 (2006.01)
(Continued)

(52) U.S. Cl.
CPC ............ G09G 3/2003 (2013.01); G01M 11/02 (2013.01); G02F 1/13 (2013.01); G09G 3/006 (2013.01);
(Continued)

(58) Field of Classification Search
CPC .......... G09G 5/02; H04N 1/60; H04N 1/6002; H04N 1/6005; H04N 1/6008
See application file for complete search history.

(56) References Cited

U.S. PATENT DOCUMENTS 7,791,621 B2    9/2010 Lin
7,864,188 B2 *  1/2011 Higgins ................... G09G 5/02
                                                345/589

(Continued)

FOREIGN PATENT DOCUMENTS

CN    101059936    10/2007
CN    101860764    10/2010
(Continued)

OTHER PUBLICATIONS

International Search Report for PCT/CN2014/076735, English translation attached to original, Both completed by the Chinese Patent Office on Dec. 31, 2014 ; Mailed Jan. 28, 2015, 6 Pages.

*Primary Examiner* — Antonio A Caschera
(74) *Attorney, Agent, or Firm* — Brooks Kushman P.C.

(57) ABSTRACT

A method of obtaining luminance and chromaticity of white in the RGBW display using RGB display, including; obtaining spectral values of a q grayscale of red sub-pixels, green sub-pixels and blue sub-pixels of the RGB display; obtaining spectral values of red, green and blue sub-pixels of a color filter in the RGB display; calculating a spectral value of the q greyscale of white in the RGB display as a spectral value of the q greyscale of the white sub-pixels of the
(Continued)

RGBW display; calculating tristimulus values $WX_q$, $WY_q$ and $WZ_q$ of the q greyscale of the white sub-pixels of the RGBW display; using the stimulus value $WY_q$ as a luminance of the q greyscale of the white sub-pixels of the RGBW display, and using the formulae $$x = \frac{WX_q}{WX_q + WY_q + WZ_q} \text{ and}$$

$$y = \frac{WY_q}{WX_q + WY_q + WZ_q}$$

to calculate a chromaticity (x, y) of the white sub-pixel of the RGBW display.

18 Claims, 1 Drawing Sheet

(51) Int. Cl.
*G02F 1/13* (2006.01)
*G09G 3/00* (2006.01)

(52) U.S. Cl.
CPC ...... *G09G 2340/06* (2013.01); *G09G 2360/16* (2013.01)

(56) References Cited

U.S. PATENT DOCUMENTS

| | | | |
|---|---|---|---|
| 8,044,967 B2 * | 10/2011 | Belik | G09G 5/02 |
| | | | 345/589 |
| 8,817,056 B2 | 8/2014 | Park | |
| 2009/0085926 A1 | 4/2009 | Kim et al. | |
| 2010/0259686 A1 | 10/2010 | Kao | |
| 2011/0149166 A1 * | 6/2011 | Botzas | H04N 5/202 |
| | | | 348/649 |
| 2012/0268502 A1 | 10/2012 | Kurasawa et al. | |
| 2013/0293567 A1 | 11/2013 | Shigeta et al. | |

FOREIGN PATENT DOCUMENTS

| | | |
|---|---|---|
| CN | 101860765 | 10/2010 |
| CN | 102063879 | 5/2011 |
| CN | 102394041 | 3/2012 |
| CN | 102402937 | 4/2012 |
| CN | 102542962 | 7/2012 |
| CN | 102749744 | 10/2012 |
| CN | 103314405 | 9/2013 |
| CN | 103366710 | 10/2013 |
| CN | 103366711 | 10/2013 |
| JP | 2007003848 | 1/2007 |
| JP | 2014033361 | 2/2014 |
| KR | 20060039460 | 5/2006 |
| TW | 201337901 | 9/2013 |
| WO | 2008096828 | 8/2008 |
| WO | 2013117005 | 8/2013 |

* cited by examiner

METHOD OF OBTAINING LUMINANCE AND CHROMATICITY OF WHITE IN RGBW DISPLAY DEVICE USING RGB DISPLAY DEVICE

CROSS-REFERENCE TO RELATED APPLICATION

This application is the U.S. national phase of PCT Application No. PCT/CN2014/076735 filed on May 4, 2014, which claims priority to Chinese Patent Application No. 201410175893.3 filed on Apr. 28, 2014, the disclosures of which are incorporated in their entirety by reference herein.

BACKGROUND OF THE INVENTION

Field of the Invention

The present invention belongs to display technical field, more specifically, the present invention relates to a method of obtaining luminance and chromaticity of white in RGBW display device using RGB display device.

Description of Prior Art

The present display devices, such as liquid crystal display device and organic light emitting diode (OLED) display device, etc., all use red (R) sub-pixels, green (G) sub-pixels and blue (B) sub-pixels to display a picture. However, in order to increase penetration rate, luminance and energy efficiency of the display device so as to ensure energy saving and environment protection, a display device displaying the picture using red (R) sub-pixels, green (G) sub-pixels, blue (B) sub-pixels and white (W) sub-pixels has already been developed. In such case, if luminance and chromaticity of the white (W) sub-pixels in the display device can be obtained, then the design on white balance and driving of the display device can be further improved.

SUMMARY OF THE INVENTION

In order to solve the above problem in the prior art, the present invention aims to provide a method of obtaining luminance and chromaticity of white in RGBW display device using RGB display device, including the steps of: 1) obtaining spectral values of a q greyscale of red sub-pixels, green sub-pixels and blue sub-pixels of the RGB display device; 2) obtaining spectral values of red sub-pixels, green sub-pixels and blue sub-pixels of a color filter in the RGB display device; 3) calculating a spectral value of the q greyscale of white in the RGB display device as a spectral value of the q greyscale of white sub-pixels of the RGBW display device, based on the obtained spectral values of the q greyscale of the red sub-pixels, the green sub-pixels and the blue sub-pixels of the RGB display device and the obtained spectral values of the red sub-pixels, the green sub-pixels and the blue sub-pixels of the color filter; 4) calculating tristimulus values $WX_q$, $WY_q$ and $WZ_q$ of the q greyscale of the white sub-pixels of the RGBW display device based on the obtained spectral value of the q greyscale of the white sub-pixels of the RGBW display device; 5) using the calculated stimulus value $WY_q$ of the q greyscale of the white sub-pixels of the RGBW display device calculated in step 4) as a luminance of the q greyscale of the white sub-pixels of the RGBW display device, and using the following formulae to calculate a chromaticity (x, y) of the q greyscale of the white sub-pixels of the RGBW display device, $$x = \frac{WX_q}{WX_q + WY_q + WZ_q},$$

$$y = \frac{WY_q}{WX_q + WY_q + WZ_q},$$

wherein, q is a greyscale number.

Furthermore, specific implementation of step 3) includes: dividing the obtained spectral values of the q greyscale of the red sub-pixels, the green sub-pixels and the blue sub-pixels of the RGB display device by the obtained spectral values of the red sub-pixels, the green sub-pixels and the blue sub-pixels of the color filter respectively, so as to calculate spectral values of the q greyscale of white in the RGB display device corresponding to the spectral values of the q greyscale of the red sub-pixels, the green sub-pixels and the blue sub-pixels of the RGB display device respectively, wherein the spectral value of the q greyscale of white in the RGB display device corresponding to the spectral value of the q greyscale of the green sub-pixels of the RGB display device is used as the spectral value of the q greyscale of the white sub-pixel of the RGBW display device.

Furthermore, in step 4), the tristimulus values $WX_q$, $WY_q$ and $WZ_q$ of the q greyscale of the white sub-pixels of the RGBW display device are calculated by using the following formulae:

$$WX_q = \frac{3}{4}k \int_\lambda \phi(\lambda)\bar{x}(\lambda)\,d\lambda,$$

$$WY_q = \frac{3}{4}k \int_\lambda \phi(\lambda)\bar{y}(\lambda)\,d\lambda,$$

$$WZ_q = \frac{3}{4}k \int_\lambda \phi(\lambda)\bar{z}(\lambda)\,d\lambda,$$

wherein, k is an adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the standard colorimetric observer.

Furthermore, an aperture ratio of the sub-pixels in said RGB display device is identical to an aperture ratio of the sub-pixels in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

Furthermore, if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$ and $kmWZ_q$, wherein k=(an area of a sub-pixel except the white sub-pixels in RGBW display device/an area of all sub-pixels in RGBW display device)/(an area of corresponding sub-pixel in RGB display device/an area of all sub-pixels in RGB display device).

The present invention also aims to provide a method of obtaining luminance and chromaticity of white in RGBW display device using RGB display device, including the steps of: 1) obtaining an spectral value of a q greyscale of full white mode of the RGB display device; 2) obtaining spectral values of the red sub-pixels, the green sub-pixels and the blue sub-pixels of the color filter in the RGB display device; 3) calculating an spectral value of the q grayscale of white in the RGB display device as an spectral value of the q grayscale of the white sub-pixels of the RGBW display device, based on the obtained spectral value of the q grayscale of full white mode of the RGB display device and the obtained spectral values of the red sub-pixels, the green sub-pixels and the blue sub-pixels of the color filter; 4) calculating tristimulus values $WX_q$, $WY_q$ and $WZ_q$ of the q grayscale of the white sub-pixels of the RGBW display device based on the obtained spectral value of the q grayscale of the white sub-pixels of the RGBW display device; 5) using the calculated stimulus value $WY_q$ of the q greyscale of the white sub-pixels of the RGBW display device as a luminance of the q greyscale of the white sub-pixels of the RGBW display device, and using the following formulae to calculate a chromaticity (x, y) of the q greyscale of the white sub-pixels of the RGBW display device, $$x = \frac{WX_q}{WX_q + WY_q + WZ_q},$$

$$y = \frac{WY_q}{WX_q + WY_q + WZ_q},$$

Wherein, q is a greyscale number.

Furthermore, specific implementation of step 3) includes: calculating the spectral value of the q grayscale of white in the RGB display device by dividing the obtained spectral value of the q grayscale of full white mode of the RGB display device by a sum of the obtained spectral values of the red sub-pixels, the green sub-pixels and the blue sub-pixels of the color filter.

Furthermore, in step 4), the tristimulus values $WX_q$, $WY_q$ and $WZ_q$ of the q greyscale of the white sub-pixels of the RGBW display device are calculated by using the following formulae:

$$WX_q = \frac{3}{4} k \int_\lambda \phi(\lambda) \bar{x}(\lambda) \, d\lambda,$$

$$WY_q = \frac{3}{4} k \int_\lambda \phi(\lambda) \bar{y}(\lambda) \, d\lambda,$$

$$WZ_q = \frac{3}{4} k \int_\lambda \phi(\lambda) \bar{z}(\lambda) \, d\lambda,$$

Wherein, k is an adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the standard colorimetric observer.

Furthermore, an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

Furthermore, if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$ and $kmWZ_q$, wherein k=(an area of an sub-pixel except the white sub-pixels in RGBW display device/an area of all sub-pixels in RGBW display device)/(an area of corresponding sub-pixel in RGB display device/an area of all sub-pixels in RGB display device).

The present invention uses the RGB display device to obtain the luminance and chromaticity of white in the RGBW display device, which is advantageous for assessing the RGBW display device, and is advantageous for the design in white balance and driver of the RGBW display device.

BRIEF DESCRIPTION OF THE DRAWINGS

These and/or other aspects, features and advantages in the embodiments of the present invention will become apparent and more readily appreciated from the following description of the embodiments, taken in conjunction with the accompanying drawings in which.

DETAILED DESCRIPTION OF THE PREFERRED EMBODIMENTS

Embodiments of the present invention will be described in detail below by referring to the accompany drawings. However, the present invention can be implemented in different manners and should not be interpreted to be limited to the specific embodiments set forth hereby. On the contrary, said embodiments are provided to explain the principle and the practical application of the present invention, so that those skilled in the art may understand various embodiments of the present invention and the various amendments adaptive to specific anticipated applications.

The present invention simulates obtaining of luminance and chromaticity of white in the RGBW display device using conventional RGB display device, wherein the RGB display device or the RGBW display device can be for example the liquid crystal display device and organic light emitting diode (OLED) display device, etc. In present embodiment, both the RGB display device and the RGBW display device are the liquid crystal display device.

Figure 1:
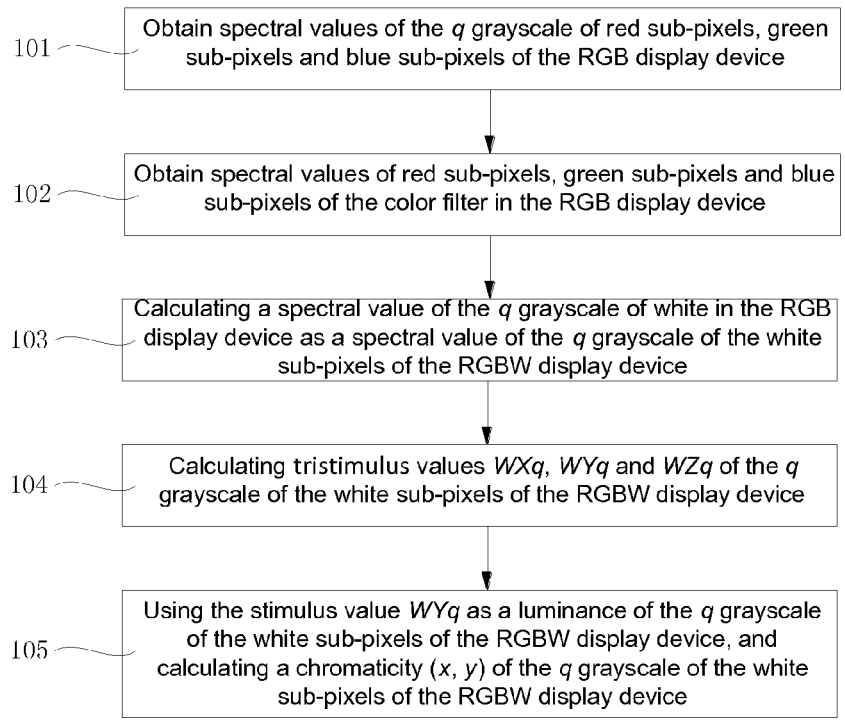
FIG. 1 is a flow chart of a method of obtaining luminance and chromaticity of white in the RGBW display device using RGB display device according to a first embodiment of the present invention.

FIG. 1 is a flow chart of a method of obtaining luminance and chromaticity of white in the RGBW display device using RGB display device according to a first embodiment of the present invention.

Before executing the method of obtaining luminance and chromaticity of white in the RGBW display device using RGB display device according to the first embodiment of the present invention, assuming that an aperture ratio of respective sub-pixels (i.e. red (R) sub-pixels, green (G) sub-pixels and blue (B) sub-pixels) in the RGB display device is identical to an aperture ratio of respective sub-pixels (i.e. red (R) sub-pixels, green (G) sub-pixels, blue (B) sub-pixels and white (W) sub-pixels) in the RGBW display device. Here, the aperture ratio of the sub-pixel refers to a ratio of a nonopaque effective area of a sub-pixel to a total area of the sub-pixel. Furthermore, assuming the respective sub-pixels in the RGB display device are identical in sizes, and the respective sub-pixels in the RGBW display device are identical in sizes, wherein the size of the sub-pixel in the RGBW display device is ¾ of the size of the sub-pixel in the RGB display device. In addition, assuming a backlight module of the RGB display device is identical to a backlight module of the RGBW display device, and a liquid crystal cell gap (or liquid crystal cell thickness) in the RGB display device is identical to a liquid crystal cell gap (or liquid crystal cell thickness) of the RGBW display device.

Referring to FIG. 1, in step 101, a spectral value of q greyscale of the red sub-pixels of the RGB display device, a spectral value of the q greyscale of the green sub-pixels of the RGB display device and a spectral value of the q greyscale of the blue sub-pixels of the RGB display device are obtained. In said step, q is the greyscale number, and a value range thereof can be 0 to 255.

In step 102, a spectral value of red sub-pixels of a color filter in the RGB display device, a spectral value of green sub-pixels of the color filter in the RGB display device and a spectral value of blue sub-pixels of the color filter in the RGB display device are obtained.

In step 103, a spectral value of the q grayscale of white in the RGB display device as a spectral value of the q grayscale of white in the RGBW display device is calculated, based on the obtained spectral values of the q grayscale of the red sub-pixels, the green sub-pixels and the blue sub-pixels of the RGB display device and the obtained spectral values of the red sub-pixels, the green sub-pixels and the blue sub-pixels of the color filter. In said step, the specific methods for calculating the spectral values of the q grayscale of white in the RGB display device are: using the obtained spectral value of the red sub-pixels of the color filter to divide the obtained spectral value of the q grayscale of red sub-pixels of the RGB display device, so as to obtain a spectral value of the q greyscale of white in the RGB display device corresponding to the red sub-pixels of the RGB display device; using the obtained spectral value of the green sub-pixels of the color filter to divide the obtained spectral value of the q grayscale of green sub-pixels of the RGB display device, so as to obtain a spectral value of the q greyscale of white in the RGB display device corresponding to the green sub-pixels of the RGB display device; using the obtained spectral value of the blue sub-pixels of the color filter to divide the obtained spectral value of the q greyscale of the blue sub-pixels of the RGB display device so as to obtain a spectral value of the q greyscale of white in the RGB display device corresponding to the blue sub-pixels of the RGB display device, wherein the obtained spectral value of the q greyscale of white in the RGB display device corresponding to the green sub-pixels of the RGB display device is used as a spectral value of the q greyscale of white sub-pixels of the RGBW display device.

In step 104, tristimulus values $WX_q$, $WY_q$ and $WZ_q$ of the q grayscale of the white sub-pixels of the RGBW display device are calculated based on the obtained spectral value of the q grayscale of the white sub-pixels of the RGBW display device. In said step, the tristimulus values $WX_q$, $WY_q$ and $WZ_q$ of the q greyscale of the white sub-pixels of the RGBW display device are calculated by using the following formulae (1), (2) and (3):

$$WX_q = \frac{3}{4}k \int_\lambda \phi(\lambda)\bar{x}(\lambda)\,d\lambda \quad (1)$$

$$WY_q = \frac{3}{4}k \int_\lambda \phi(\lambda)\bar{y}(\lambda)\,d\lambda \quad (2)$$

$$WZ_q = \frac{3}{4}k \int_\lambda \phi(\lambda)\bar{z}(\lambda)\,d\lambda \quad (3)$$

Wherein, k is an adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the CIE1931 standard colorimetric observer.

In step 105, the calculated stimulus value $WY_q$ of the q greyscale of the white sub-pixels of the RGBW display device is used as a luminance of the q greyscale of the white sub-pixels of the RGBW display device, and the following formulae (4) and (5) are used to calculate a chromaticity (x, y) of the q greyscale of the white sub-pixels of the RGBW display device, $$x = \frac{WX_q}{WX_q + WY_q + WZ_q} \quad (4)$$

$$y = \frac{WY_q}{WX_q + WY_q + WZ_q} \quad (5)$$

The first embodiment of the present invention uses the RGB display device to obtain the luminance and chromaticity of white in the RGBW display device, which is advantageous for assessing the RGBW display device, and is advantageous for the design in white balance and driving of the RGBW display device.

Furthermore, in the first embodiment of the present invention, if the aperture ratio of the respective sub-pixels in said RGBW display device is m times of the aperture ratio of the respective sub-pixels in said RGB display device, and if k=(an area of any one sub-pixel (red sub-pixel, green sub-pixel or blue sub-pixel) except the white sub-pixels in RGBW display device/an area of all the sub-pixels (red sub-pixel, green sub-pixel, blue sub-pixel and white sub-pixel) in RGBW display device)/(an area of a corresponding sub-pixel (red sub-pixel, green sub-pixel or blue sub-pixel) in RGB display device)/an area of all sub-pixels (red sub-pixels, green sub-pixels and blue sub-pixels) in RGB display device), then the tristimulus values of the q greyscale of the white sub-pixel of the RGBW display device should be $kmWX_q$, $kmWY_q$ and $kmWZ_q$.

Figure 2:
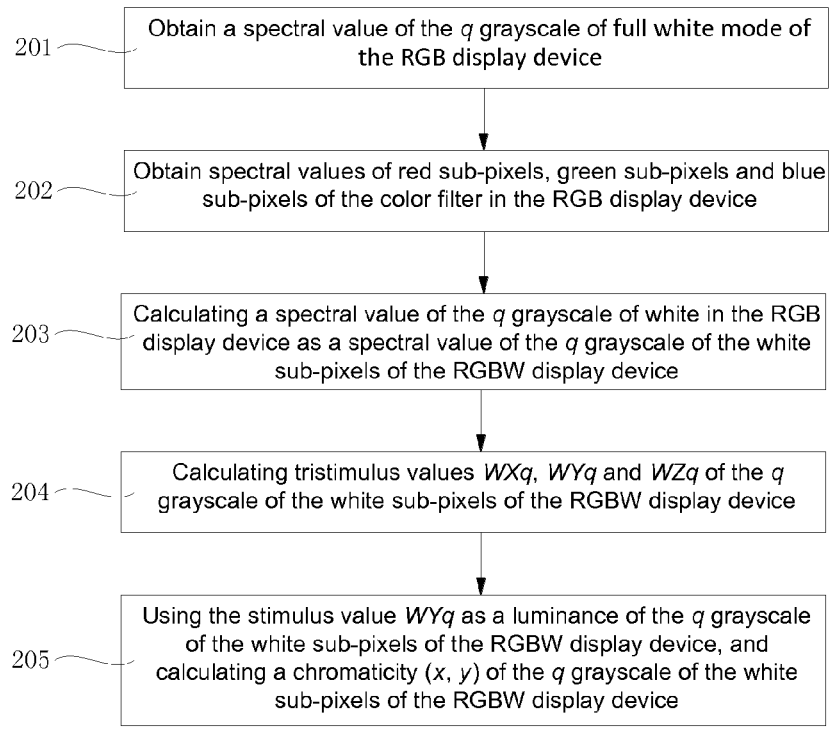
FIG. 2 is a flow chart of a method of obtaining luminance and chromaticity of white in the RGBW display device using RGB display device according to a second embodiment of the present invention.

FIG. 2 is a flow chart of a method of obtaining luminance and chromaticity of white in the RGBW display device using RGB display device according to the second embodiment of the present invention.

Before executing the method of obtaining luminance and chromaticity of white in the RGBW display device using RGB display device according to the second embodiment of the present invention, assuming that the aperture ratio of the sub-pixels in the RGB display device (i.e. the red (R) sub-pixels, the green (G) sub-pixels and the blue (B) sub-pixels) is identical to the aperture ratio of the sub-pixels in the RGBW display device (i.e. the red (R) sub-pixels, the green (G) sub-pixels, the blue (B) sub-pixels and the white (W) sub-pixels). Here, the aperture ratio of the sub-pixel refers to a ratio of a nonopaque effective area of a sub-pixel to a total area of the sub-pixel. Furthermore, assuming the respective sub-pixels in the RGB display device are identical in sizes, and the respective sub-pixels in the RGBW display device are identical in sizes, wherein the size of the sub-pixel in the RGBW display device is ¾ of the size of the sub-pixel in the RGB display device. In addition, assuming the backlight module of the RGB display device is identical to the backlight module of the RGBW display device, and the liquid crystal cell gap (or liquid crystal cell thickness) in the RGB display device is identical to the liquid crystal cell gap (or liquid crystal cell thickness) of the RGBW display device.

Referring to FIG. 2, in step 201, a spectral values of the q grayscale of full white mode of the RGB display device is obtained. In said step, q is the greyscale number, and the value range thereof can be 0 to 255.

In step 202, the spectral value of the red sub-pixels of the color filter in the RGB display device, the spectral value of the green sub-pixels of the color filter in the RGB display device and the spectral value of the blue sub-pixels of the color filter in the RGB display device are obtained.

In step 203, the spectral value of the q grayscale of white in the RGB display device as the spectral value of the q grayscale of the white sub-pixels of the RGBW display device, is calculated based on the obtained spectral value of the q grayscale of full white mode of the RGB display device and the obtained spectral values of the red sub-pixels, the green sub-pixels and the blue sub-pixels of the color filter. In said step, the full white mode of the RGB display device indicates that the ratio between the greyscale of the red sub-pixels, the greyscale of the green sub-pixels and the greyscale of the blue sub-pixels of the RGB display device is 1:1:1. In said step, the specific methods for calculating the spectral value of the q grayscale of white in the RGB display device is: calculating the spectral value of the q grayscale of white in the RGB display device as the spectral value of the q grayscale of the white sub-pixel of the RGBW display device by dividing the obtained spectral value of the q grayscale of full white mode of the RGB display device by the sum of the obtained spectral values of the red sub-pixels, the green sub-pixels and the blue sub-pixels of the color filter.

In step 204, tristimulus values $WX_q$, $WY_q$ and $WZ_q$ of the q grayscale of the white sub-pixel of the RGBW display device are calculated based on the obtained spectral value of the q grayscale of the white sub-pixels of the RGBW display device. In said step, the tristimulus values $WX_q$, $WY_q$ and $WZ_q$ of the q greyscale of the white sub-pixels of the RGBW display device are calculated by using the following formulae (6), (7), and (8):

$$WX_q = \frac{3}{4}k \int_\lambda \phi(\lambda)\bar{x}(\lambda)\,d\lambda \quad (6)$$

$$WY_q = \frac{3}{4}k \int_\lambda \phi(\lambda)\bar{y}(\lambda)\,d\lambda \quad (7)$$

$$WZ_q = \frac{3}{4}k \int_\lambda \phi(\lambda)\bar{z}(\lambda)\,d\lambda \quad (8)$$

Wherein, k is the adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the CIE1931 standard colorimetric observer.

In step 205, the calculated stimulus value $WY_q$ of the q greyscale of the white sub-pixels of the RGBW display device is used as the luminance of the q greyscale of the white sub-pixels of the RGBW display device, and the following formulae (9) and (10) are used to calculate a chromaticity (x, y) of the q greyscale of the white sub-pixels of the RGBW display device, $$x = \frac{WX_q}{WX_q + WY_q + WZ_q} \quad (9)$$

$$y = \frac{WY_q}{WX_q + WY_q + WZ_q} \quad (10)$$

The second embodiment of the present invention uses the RGB display device to obtain the luminance and chromaticity of white in the RGBW display device, which is advantageous for assessing the RGBW display device, and is advantageous for the design in white balance and driving of the RGBW display device.

Furthermore, in the second embodiment of the present invention, if the aperture ratio of the respective sub-pixels in said RGBW display device is m times of the aperture ratio of the respective sub-pixels in said RGB display device, and if k=(an area of any one sub-pixel (red sub-pixel, green sub-pixel or blue sub-pixel) except the white sub-pixels in RGBW display device/an area of all the sub-pixels (red sub-pixels, green sub-pixels, blue sub-pixels and white sub-pixels) in RGBW display device)/(an area of corresponding sub-pixel (red sub-pixel, green sub-pixel or blue sub-pixel) in RGB display device/area of all sub-pixels (red sub-pixels, green sub-pixels and blue sub-pixels) in RGB display device), then the tristimulus values of the q greyscale of the white sub-pixel of the RGBW display device should be $kmWX_q$, $kmWY_q$ and $kmWZ_q$.

Based on above, the embodiment of the present invention uses the RGB display device to obtain the luminance and chromaticity of white in the RGBW display device, which is advantageous for assessing the RGBW display device, and is advantageous for the design in white balance and driving of the RGBW display device.

Although the present invention is described with reference to the special exemplary embodiment, it will be understood by those of ordinary skilled in the art that various changes in form and details may be made therein without departing from the spirit and scope of the present invention as defined by the following claims and its equivalents.

The invention claimed is:

1. A method of obtaining luminance and chromaticity of white in a RGBW display device using a RGB display device, comprising:
   1) obtaining spectral values of a q grayscale of red sub-pixels, green sub-pixels and blue sub-pixels of the RGB display device;
   2) obtaining spectral values of red sub-pixels, green sub-pixels and blue sub-pixels of a color filter in the RGB display device;
   3) calculating a spectral value of the q grayscale of white in the RGB display device as a spectral value of the q grayscale of white sub-pixels of the RGBW display device, based on the obtained spectral values of the q grayscale of the red sub-pixels, the green sub-pixels and the blue sub-pixels of the RGB display device and the obtained spectral values of the red sub-pixels, the green sub-pixels and the blue sub-pixels of the color filter;
   4) calculating tristimulus values $WX_q$, $WY_q$ and $WZ_q$ of the q grayscale of the white sub-pixels of the RGBW display device based on the obtained spectral value of the q grayscale of the white sub-pixels of the RGBW display device;
   5) using the calculated stimulus value $WY_q$ of the q greyscale of the white sub-pixels of the RGBW display device as a luminance of the q greyscale of the white sub-pixels of the RGBW display device, and using the following formulae to calculate a chromaticity (x, y) of the q greyscale of the white sub-pixels of the RGBW display device, $$x = \frac{WX_q}{WX_q + WY_q + WZ_q},$$

$$y = \frac{WY_q}{WX_q + WY_q + WZ_q},$$

wherein, q is a greyscale number.

2. The method of claim 1, wherein specific implementation of step 3) includes: dividing the obtained spectral values of the q greyscale of the red sub-pixels, the green sub-pixels and the blue sub-pixels of the RGB display device by the obtained spectral values of the red sub-pixels, the green sub-pixels and the blue sub-pixels of the color filter respectively, so as to calculate spectral values of the q grayscale of white in the RGB display device corresponding to the spectral values of the q grayscale of the red sub-pixels, the green sub-pixels and the blue sub-pixels of the RGB display device respectively, wherein the spectral value of the q greyscale of white in the RGB display device corresponding to the spectral value of the q greyscale of the green sub-pixels of the RGB display device is used as the spectral value of the q greyscale of the white sub-pixel of the RGBW display device.

3. The method of claim 2, wherein an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

4. The method of claim 2, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$, and $kmWZ_q$, wherein k=(an area of a sub-pixel except the white sub-pixels in RGBW display device/an area of all sub-pixels in RGBW display device)/(an area of corresponding sub-pixel in RGB display device/an area of all sub-pixels in RGB display device).

5. The method of claim 2, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$, and $kmWZ_q$, wherein k=(an area of a sub-pixel except the white sub-pixels in RGBW display device/an area of all sub-pixels in RGBW display device)/(an area of corresponding sub-pixel in RGB display device/an area of all sub-pixels in RGB display device).

6. The method of claim 1, wherein in step 4), the tristimulus values $WX_q$, $WY_q$ and $WZ_q$ of the q greyscale of the white sub-pixels of the RGBW display device are calculated by using the following formulae:

$$WX_q = \frac{3}{4}k\int_\lambda \phi(\lambda)\bar{x}(\lambda)d\lambda,$$

-continued $$WY_q = \frac{3}{4}k\int_\lambda \phi(\lambda)\bar{y}(\lambda)d\lambda,$$

$$WZ_q = \frac{3}{4}k\int_\lambda \phi(\lambda)\bar{z}(\lambda)d\lambda,$$

wherein, k is an adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the standard colorimetric observer.

7. The method of claim 6, wherein an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

8. The method of claim 1, wherein an aperture ratio of the sub-pixels in said RGB display device is identical to an aperture ratio of the sub-pixels in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

9. The method of claim 1, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$ and $kmWZ_q$, wherein k=(an area of a sub-pixel except the white sub-pixels in RGBW display device/an area of all sub-pixels in RGBW display device)/(an area of corresponding sub-pixel in RGB display device/an area of all sub-pixels in RGB display device).

10. A method of obtaining luminance and chromaticity of white in a RGBW display device using a RGB display device, comprising:
  1) obtaining a spectral value of a q grayscale of full white mode of the RGB display device;
  2) obtaining spectral values of the red sub-pixels, the green sub-pixels and the blue sub-pixels of the color filter in the RGB display device;
  3) calculating a spectral value of the q grayscale of white in the RGB display device as a spectral value of the q grayscale of the white sub-pixels of the RGBW display device, based on the obtained spectral value of the q grayscale of full white mode of the RGB display device and the obtained spectral values of the red sub-pixels, the green sub-pixels and the blue sub-pixels of the color filter;
  4) calculating tristimulus values $WX_q$, $WY_q$ and $WZ_q$ of the q grayscale of the white sub-pixels of the RGBW display device based on the obtained spectral value of the q grayscale of the white sub-pixels of the RGBW display device;
  5) using the calculated stimulus value $WY_q$ of the q greyscale of the white sub-pixels of the RGBW display device as a luminance of the q greyscale of the white sub-pixels of the RGBW display device, and using the following formulae to calculate a chromaticity (x, y) of the q greyscale of the white sub-pixels of the RGBW display device, $$x = \frac{WX_q}{WX_q + WY_q + WZ_q},$$

$$y = \frac{WY_q}{WX_q + WY_q + WZ_q},$$

wherein q is a greyscale number.

11. The method of claim 10, wherein specific implementation of step 3) includes: calculating the spectral value of the q grayscale of white in the RGB display device by dividing the obtained spectral value of the q grayscale of full white mode of the RGB display device by a sum of the obtained spectral values of the red sub-pixels, the green sub-pixels and the blue sub-pixels of the color filter.

12. The method of claim 11, wherein an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

13. The method of claim 11, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$, and $kmWZ_q$, wherein k=(an area of an sub-pixel except the white sub-pixels in RGBW display device/an area of all sub-pixels in RGBW display device)/(an area of corresponding sub-pixel in RGB display device/an area of all sub-pixels in RGB display device).

14. The method of claim 10, wherein in step 4), the tristimulus values $WX_q$, $WY_q$ and $WZ_q$ of the q greyscale of the white sub-pixels of the RGBW display device are calculated by using the following formulae:

$$WX_q = \frac{3}{4}k \int_\lambda \phi(\lambda)\bar{x}(\lambda)\,d\lambda,$$

$$WY_q = \frac{3}{4}k \int_\lambda \phi(\lambda)\bar{y}(\lambda)\,d\lambda,$$

$$WZ_q = \frac{3}{4}k \int_\lambda \phi(\lambda)\bar{z}(\lambda)\,d\lambda,$$

wherein, k is an adjustment factor, $\phi(\lambda)$ is the spectral value of the q greyscale of the white sub-pixels of the RGBW display device, and $\bar{x}(\lambda)$, $\bar{y}(\lambda)$ and $\bar{z}(\lambda)$ are spectral tristimulus values of the standard colorimetric observer.

15. The method of claim 14, wherein an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

16. The method of claim 14, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$, and $kmWZ_q$, wherein k=(an area of an sub-pixel except the white sub-pixels in RGBW display device/an area of all sub-pixels in RGBW display device)/(an area of corresponding sub-pixel in RGB display device/an area of all sub-pixels in RGB display device).

17. The method of claim 10, wherein an aperture ratio of the sub-pixel in said RGB display device is identical to an aperture ratio of the sub-pixel in said RGBW display device; each sub-pixels in said RGB display device are identical in sizes; each sub-pixels in said RGBW display device are identical in sizes; the size of the sub-pixel in said RGBW display device is ¾ of the size of the sub-pixel in said RGB display device.

18. The method of claim 10, wherein if an aperture ratio of each sub-pixels in said RGBW display device is m times of an aperture ratio of each sub-pixels in said RGB display device, then the tristimulus values of the q greyscale of the white sub-pixels of the RGBW display device are $kmWX_q$, $kmWY_q$ and $kmWZ_q$, wherein k=(an area of an sub-pixel except the white sub-pixels in RGBW display device/an area of all sub-pixels in RGBW display device)/(an area of corresponding sub-pixel in RGB display device/an area of all sub-pixels in RGB display device).

* * * * *